United States Patent
Yi

(10) Patent No.: US 9,395,471 B2
(45) Date of Patent: Jul. 19, 2016

(54) DISPLAY DEVICE

(71) Applicant: Samsung Display Co., Ltd., Yongin, Gyeonggi-Do (KR)

(72) Inventor: Sang-Min Yi, Yongin (KR)

(73) Assignee: Samsung Display Co., Ltd., Giheung-Gu, Yongin-si, Gyeonggi-Do (KR)

( * ) Notice: Subject to any disclaimer, the term of this patent is extended or adjusted under 35 U.S.C. 154(b) by 47 days.

(21) Appl. No.: 13/785,518

(22) Filed: Mar. 5, 2013

(65) Prior Publication Data

US 2014/0098513 A1    Apr. 10, 2014

(30) Foreign Application Priority Data

Oct. 8, 2012 (KR) .................. 10-2012-0111338

(51) Int. Cl.
*G02B 5/00* (2006.01)
*G02F 1/1335* (2006.01)

(52) U.S. Cl.
CPC .......... *G02B 5/003* (2013.01); *G02F 1/133512* (2013.01); *G02F 1/133528* (2013.01)

(58) Field of Classification Search
CPC .............. G02B 5/003; G02F 1/133512; G02F 1/13362
USPC ............ 362/97.1–97.4, 351; 349/58, 96, 110; 345/32, 44–46, 48, 84
See application file for complete search history.

(56) References Cited

U.S. PATENT DOCUMENTS

| | | | |
|---|---|---|---|
| 4,088,400 A * | 5/1978 | Assouline et al. | 353/20 |
| 4,964,702 A | 10/1990 | Sugimoto et al. | |
| 5,237,436 A | 8/1993 | Khan et al. | |
| 5,568,291 A * | 10/1996 | Murata et al. | 349/110 |
| 5,757,452 A | 5/1998 | Masaki et al. | |
| 6,127,072 A * | 10/2000 | Shiba et al. | 430/7 |
| 7,666,557 B2 * | 2/2010 | Sun et al. | 430/7 |
| 7,755,263 B2 | 7/2010 | Park et al. | |
| 8,094,254 B2 | 1/2012 | Yamazaki et al. | |
| 2002/0191131 A1 * | 12/2002 | Ota et al. | 349/110 |
| 2009/0059174 A1 * | 3/2009 | Shirasaka et al. | 353/20 |
| 2009/0086123 A1 * | 4/2009 | Tsuji et al. | 349/58 |
| 2011/0007246 A1 * | 1/2011 | Moon | 349/96 |
| 2011/0018823 A1 * | 1/2011 | Moon | 345/173 |
| 2011/0026240 A1 * | 2/2011 | Hayashi et al. | 362/97.1 |
| 2011/0249215 A1 * | 10/2011 | Jung et al. | 349/61 |
| 2012/0092313 A1 * | 4/2012 | Choi | 345/206 |
| 2014/0016043 A1 * | 1/2014 | Chen et al. | 349/12 |

FOREIGN PATENT DOCUMENTS

| | | |
|---|---|---|
| JP | 09-049909 | 2/1997 |
| KR | 10-2004-0056752 | 7/2004 |
| KR | 10-2007-0015697 | 2/2007 |
| KR | 10-2012-0066272 | 6/2012 |

* cited by examiner

*Primary Examiner* — Evan Dzierzynski
*Assistant Examiner* — Christopher E Dunay
(74) *Attorney, Agent, or Firm* — Robert E. Bushnell, Esq.

(57) ABSTRACT

A display device includes a display panel including a display area for displaying an image and a non-display area adjacent to the display area, a polarizing plate positioned on the display panel and including a polarizing layer for polarizing light that passes through the polarizing layer, and a light shielding layer positioned between the display panel and the polarizing plate. The light shielding layer is formed at an edge of the display panel to correspond to the non-display area.

7 Claims, 3 Drawing Sheets

DISPLAY DEVICE

CLAIM OF PRIORITY

This application makes reference to, incorporates the same herein, and claims all benefits accruing under 35 U.S.C. §119 from an application for DISPLAY DEVICE earlier filed in the Korean Intellectual Property Office on Oct. 8, 2012 and there duly assigned Serial No. 10-2012-0111338.

BACKGROUND OF THE INVENTION

1. Field of the Invention

The present invention relates to a display device. More particularly, the present invention relates to a display device including a polarizing plate.

2. Description of the Related Art

A display device is a device for displaying an image. Recently, a display device including an organic light emitting element (an organic light emitting diode (OLED)) has been spotlighted.

Since the organic light emitting element has a self-light emitting characteristic and does not need an additional light source unlike a liquid crystal display (LCD) device, the thickness and weight of the entire display device may be reduced. In addition, the organic light emitting element has high quality characteristics such as low power consumption, high luminance, and high response speed.

In general, the display device includes a display panel for displaying an image and a polarizing plate positioned on the display panel to polarize light to suppress reflection of external light by the display panel, to improve the visibility of the entire display device, and to minimize the loss of light emitted from the light emitting element to the outside.

On the other hand, as the design of the display device is improved, a display device without a bezel for accommodating the frame of the display panel or with a very small bezel is developed. At this time, a film that does not transmit light is attached or printed to a non-display area on which an image is not displayed in the display device to prevent circuit wires from being visible and to improve visual effects.

However, such a display device has a problem in that a light leakage phenomenon is generated on the side surface of the display panel.

The above information disclosed in this Background section is only for enhancement of understanding of the background of the invention and therefore it may contain information that does not form the prior art that is already known in this country to a person of ordinary skill in the art.

SUMMARY OF THE INVENTION

One or more exemplary embodiments of the present invention may provide a display device that is capable of simultaneously preventing a circuit wire of a non-display area of a display panel from being visible and preventing a light leakage phenomenon from being generated on the side surface of the display panel.

According to an aspect of the present invention, a display device is provided, including a display panel including a display area for displaying an image and a non-display area adjacent to the display area, a polarizing plate positioned on the display panel and including a polarizing layer for polarizing light that passes through the polarizing layer, and a light shielding layer positioned between the display panel and the polarizing plate; wherein the light shielding layer is formed at an edge of the display panel to correspond to the non-display area.

The light shielding layer may be formed to surround the top surface and the side surface of the display panel.

The light shielding layer may be formed to be bent and extended from the top surface of the display panel to the side surface of the display panel.

The polarizing plate may further include a phase delay layer positioned between the polarizing layer and the light shielding layer.

The phase delay layer may delay the phase of the light by $\lambda/4$.

The polarizing plate may further include a protective layer positioned on the polarizing layer.

The light shielding layer may be a printed layer to which a black material is printed.

The light shielding layer may be a printed layer to which a metal mirror material is printed.

The light shielding layer formed on the top surface of the display panel may be formed to a thickness of 2-3 μm.

The display panel may include an organic light emitting element.

The light shielding layer in the display device may simultaneously prevent the circuit wire of the non-display area of the display panel from being visible and prevent the light leakage phenomenon from being generated on the side surface of the display panel.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components wherein.

DETAILED DESCRIPTION OF THE INVENTION

Figure 1:
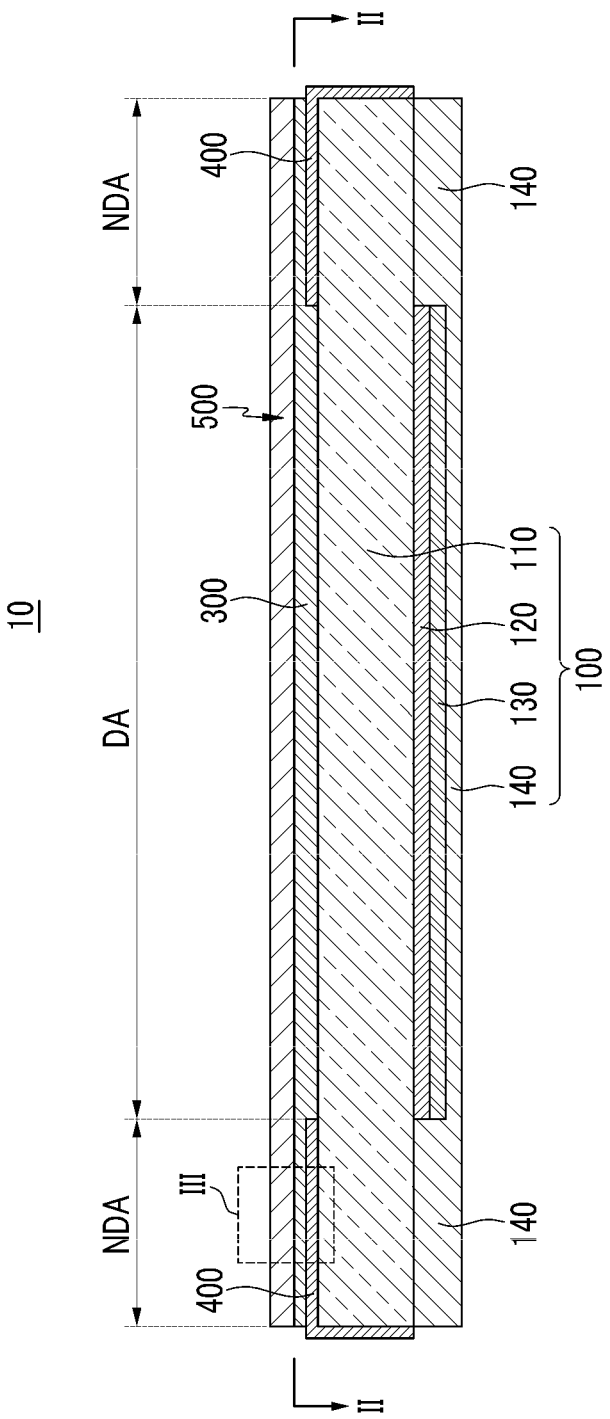
FIG. 1 is a cross-sectional view illustrating a display device according to an exemplary embodiment of the present invention.

Hereinafter, the present invention will be described in detail with reference to the accompanying drawings so that a person of ordinary skill in the art may easily perform the present invention. Reference will now be made in detail to embodiments, examples of which are illustrated in the accompanying drawings, wherein like reference numerals refer to like elements throughout. As those skilled in the art would realize, the described embodiments may be modified in various different ways, all without departing from the spirit or scope of the present invention. Accordingly, the embodiments are merely described below, by referring to the figures, to explain aspects of the present description.

The drawings and description are to be regarded as illustrative in nature and not restrictive. In addition, since the sizes and thicknesses of the elements in the drawings are arbitrarily illustrated for better understanding and ease of description, the present invention is not limited to as illustrated.

In the drawings, the thickness of layers, films, panels, regions, etc., are exaggerated for clarity. In the drawings, for better understanding and ease of description, the thicknesses of partial layers and regions are exaggerated. When a layer, a film, a region, or a plate is referred to as being "on" another part, it can be directly on the other part or intervening parts may also be present.

In addition, unless explicitly described to the contrary, the word "comprise" and variations such as "comprises" or "comprising" will be understood to imply the inclusion of stated elements but not the exclusion of any other elements. In addition, in the entire specification, "on" means being positioned on or under an object part and does not necessarily mean being positioned on the object part based on a gravity direction.

Hereinafter, referring to FIGS. 1 to 3, a display device according to an exemplary embodiment of the present invention will be described.

FIG. 1 is a cross-sectional view illustrating a display device according to an exemplary embodiment of the present invention. FIG. 2 is a cross-sectional view taken along the line II-II of FIG. 1. FIG. 3 is a drawing in which the part III of FIG. 1 is enlarged.

Referring to FIG. 1, a display device 10 according to an exemplary embodiment of the present invention may include a display panel 100, an adhesive layer 300, a polarizing plate 500, and a light shielding layer 400.

According to an exemplary embodiment of the present invention, the display panel 100 may have a display area (DA) for displaying an image and a non-display area (NDA) adjacent to the display area (DA).

The display panel 100 corresponding to the display area (DA) may include a substrate 110, a wire unit 120, an organic light emitting element 130, and an encapsulation layer 140. The display panel 100 corresponding to the non-display area (NDA) may include a substrate 110, and an encapsulation layer 140.

At this time, the substrate 110 may be formed of a light transmitting material such as a polymer, quartz, glass, and a metal.

The wire unit 120 and the organic light emitting element 130 are positioned on the substrate 110 sequentially. The substrate 110 may be disposed to be opposite to the encapsulation layer 140 with the wire unit 120 and the organic light emitting element 130 interposed therebetween.

At this time, the encapsulation layer 140 for encapsulating the organic light emitting element 130 on the substrate 110 may include at least one organic layer and at least one inorganic layer according to an exemplary embodiment of the present invention.

In addition, the substrate 110 and the encapsulation layer 140 may be attached to each other to be sealed up corresponding to the non-display area (NDA) and may protect the wire unit 120 and the organic light emitting element 130 against external interference and external moisture.

According to an exemplary embodiment of the present invention, the wire unit 120 may include a thin film transistor (TFT), and transmits a signal to the organic light emitting element 130 to drive the organic light emitting element 130.

The organic light emitting element 130 may be positioned on the wire unit 120.

In addition, the organic light emitting element 130 positioned on the wire unit 120 receives the signal from the wire unit 120 and emits light by the received signal to display an image.

Figure 2:
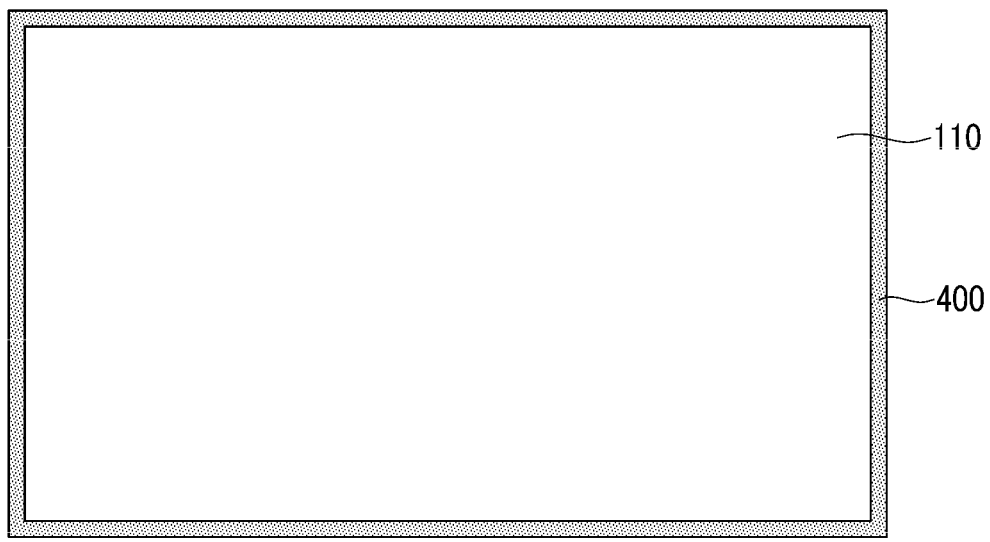
FIG. 2 is a cross-sectional view taken along the line II-II of FIG. 1.

On the other hand, according to an exemplary embodiment of the present invention, as shown in FIG. 1 and FIG. 2, the above-described elements that form the display panel 100 may be arranged in the order of the substrate 110, the wire unit 120, the organic light emitting element 130, and the encapsulation layer 140 with reference to FIG. 1 in a vertical direction. However, the present invention is not limited to the above. The elements may be arranged in the reverse order of the encapsulation layer 140, the organic light emitting element 130, the wire unit 120, and the substrate 110.

On the other hand, since the structures of the wire unit 120 and the organic light emitting element 130 are already known, detailed description thereof will be omitted.

According to an exemplary embodiment of the present invention, as shown in FIG. 1, the polarizing plate 500 may be positioned on the display panel 100 with the adhesive layer 300 interposed therebetween.

According to an exemplary embodiment of the present invention, although not shown in the drawing, a touch panel may be provided on the display panel 100 so that the touch panel may be positioned between the polarizing plate 500 and the display panel 100.

According to an exemplary embodiment of the present invention, the polarizing plate 500 may suppress reflection of external light by the display panel 100 from which light is emitted and by the touch panel to improve the visibility of the entire display device 10 and to minimize the loss of light emitted from the organic light emitting element 130 to the outside.

In addition, the polarizing plate 500 may prevent a wire of a pad or a driving unit that may be disposed in the non-display area (NDA) adjacent to the display area (DA) for displaying an image from being visible to the outside.

Figure 3:
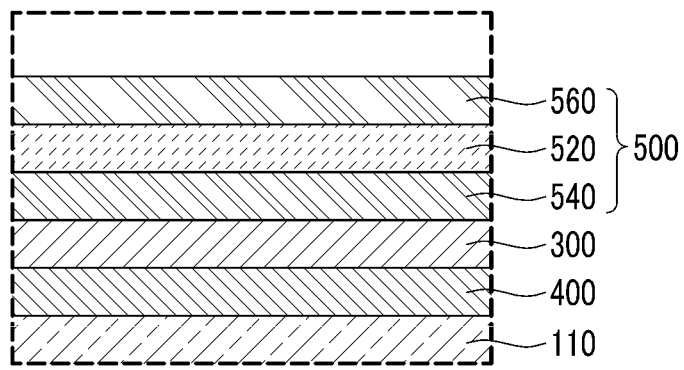
FIG. 3 is a drawing in which the part III of FIG. 1 is enlarged.

According to an exemplary embodiment of the present invention, the polarizing plate 500 may be in a form of a film, and referring to FIG. 3, may include a polarizing layer 520, a protective layer 560, and a phase delay layer 540.

The polarizing layer 520 may be positioned on the display panel 100 including the organic light emitting element 130 from which light is emitted, and may be positioned to correspond to the display area (DA) and the non-display area (NDA).

The polarizing layer 520 may have a polarization axis and linearly polarizes light that passes through the polarizing layer 520 in the polarization axis direction.

Concretely, the polarizing layer 520 transmits light that coincides with the polarization axis and absorbs light that does not coincide with the polarization axis. Therefore, when light passes through the polarizing layer 520, the light is linearly polarized in the polarization axis direction.

According to an exemplary embodiment of the present invention, the polarizing layer 520 may be formed in a matrix, and may include iodine and a dye. Here, the matrix may be a structure formed of polyvinyl alcohol (PVA).

On the other hand, the polarizing layer 520 may simultaneously include iodine, a dye, and PVA, and has a reduced concentration of at least one of iodine, dye, and PVA to simultaneously improve the transmittance of the polarizing layer 520 and reduce the polarization degree of the polarizing layer 520.

When only iodine is contained in the PVA to form the polarizing layer 520, iodine ion chains are oriented by drawn and orients PVA chains so that the polarizing layer 520 has a polarization property. When the PVA contains only iodine, the polarization efficiency and transmittance of the polarizing layer 520 are excellent. However, due to the sublimation property of iodine, durability to temperature, humidity, and light are deteriorated so that the uniformity of the polarizing layer 520 may be deteriorated. When only dye is contained in the PVA to form the polarizing layer 520, as in the case where only iodine is used, the dye is oriented by the drawn and orients PVA chains so that the polarizing layer 520 has the polarization property. When the PVA contains only dye, since the dye does not have the sublimation property unlike iodine, the durability of the polarizing layer 520 may be excellent; however, the dichroism of the polarizing layer 520 may be deteriorated. Therefore, since insufficient uniformity of iodine is complemented by dye in the polarizing layer 520 where iodine having excellent uniformity and dye having excellent durability are simultaneously contained in PVA, the uniformity of the polarizing layer 520 is improved.

The polarizing layer 520 has an absorption axis and a polarization axis. The absorption axis in which iodine ion chains and dye ion chains are drawn and oriented extinguishes one of two vertical components of light that vibrates in an arbitrary direction when the component interacts with the electrons of the polarizing layer 520 so that electrical energy of light is changed into electronic energy and the polarization axis perpendicular to the absorption axis transmits light that vibrates in the polarization axis direction.

The polarizing layer 520 may be manufactured by a method of drawing a PVA film to coordinate iodine and dye with each other, a method of absorbing iodine and dye into the PVA film to draw the PVA film, and a method of simultaneously dying iodine and dye into the PVA film and drawing the PVA film.

At this time, the weight ratio of iodine and dye used for the polarizing layer 520 may be 1:1 to 1:2. When the weight ratio of iodine and dye satisfies the range, the uniformity and polarization degree of the polarizing layer 520 are not deteriorated but are excellent.

On the other hand, the protective layer 560 for protecting and supporting the polarizing layer 520 that is drawn to be weak may be positioned on the top surface of the polarizing layer 520.

According to an exemplary embodiment of the present invention, the protective layer 560 may include TAC resin.

In addition, a hard coating layer for preventing the polarizing plate 500 from being damaged may be positioned on the protective layer 560.

On the other hand, according to an exemplary embodiment of the present invention, although not shown in the drawing, the protective layer 560 may be positioned on the bottom surface of the polarizing layer 520.

Therefore, a pair of protective layers 560 may protect the polarizing layer 520 with the polarizing layer 520 interposed therebetween.

The phase delay layer 540 delays the phase of light that passes through the phase delay layer 540 by λ/4 and simultaneously converts linearly polarized light that passes through the phase delay layer 540 into circularly polarized light and circularly polarized light that passes through the phase delay layer 540 into linearly polarized light.

The phase delay layer 540 and the polarizing layer 520 are sequentially laminated on the display panel 100 to suppress reflection of external light incident on the display device 10. Hereinafter, the above process will be described in detail.

First, external light with various phases is converted into linearly polarized light having a first linear polarization axis while passing through the polarizing layer 520, and the linearly polarized light is converted into circularly polarized light having a first circular polarization axis while passing through the phase delay layer 540. The circularly polarized light is reflected by the display panel 100 to be converted into circularly polarized light having a second circular polarization axis in an opposite direction to the first circular polarization axis. The circularly polarized light reflected by the display panel 100 to have the second circular polarization axis is converted into linearly polarized light having a second linear polarization axis in an opposite direction to the first linear polarization axis while passing through the phase delay layer 540, and the linearly polarized light having the second linear polarization axis is absorbed by the polarizing layer 520.

As described above, although external light incident on the display device 10 is reflected by the display panel 100, the external light is absorbed into the polarizing layer 520 so that it is possible to suppress the quality of an image formed by light emitted by the organic light emitting element 130 of the display panel 100 from being deteriorated by reflection of external light. That is, display quality of the entire display device 10 may be improved.

On the other hand, in order to improve quality of the display device 10, it is necessary to prevent circuit wires of a pad or a driver that may be disposed in the non-display area (NDA) of the display panel 100 from being visible to the outside. In the case of the display device without a bezel, it is necessary to prevent the light leakage phenomenon generated on the side surface of the display panel 100.

In relation to the above, referring to FIG. 1, the display device 10 according to an exemplary embodiment of the present invention may include the light shielding layer 400 between the display panel 100 and the polarizing plate 500.

Hereinafter, the light shielding layer 400 will be described in detail.

Referring to FIGS. 1 and 2, the light shielding layer 400 for shielding external light incident on the display device 10 and light emitted from the display panel 100 is positioned between the display panel 100 and the polarizing plate 500.

According to an exemplary embodiment of the present invention, the light shielding layer 400 may be formed at the edge of the display panel 100 to correspond to the non-display area (NDA) of the display panel 100.

Therefore, the light shielding layer 400 shields external light incident from the outside to the display device 10 and light emitted from the organic light emitting element 130 of the display panel 100 to correspond to the non-display area (NDA) to prevent the circuit wire of the pad or the driver positioned in the non-display area (NDA) from being visible to the outside.

In addition, the light shielding layer 400 may includes a pattern for decorating the outline of the display panel 100 corresponding to the non-display area (NDA) of the display panel 100 to improve design quality of the display device 10.

According to an exemplary embodiment of the present invention, as shown in FIGS. 1 and 2, the light shielding layer 400 may be formed to surround the top surface and the side surface of the display panel 100.

Therefore, it is possible to simultaneously prevent the circuit wire of the pad or the driver that may be disposed in the non-display area (NDA) from being visible to the outside and prevent the light leakage phenomenon generated on the side surface of the display panel 100.

At this time, according to an exemplary embodiment of the present invention, the light shielding layer 400 may be bent from the top surface of the display panel 100 to the side surface of the display panel 100 to be extended.

That is, referring to FIG. 1, the light shielding layer 400 may be extended from the top surface of the edge of the display panel 100 in a horizontal direction and may be bent at the edge of the display panel 100 in a vertical direction to be extended so that the light shielding layer 400 may be '¬'-shaped in the cross-sectional view.

As described above, the light shielding layer 400 is formed to surround the top surface and the side surface of the display panel 100 so that it is not necessary to perform additional work for preventing the circuit wire of the pad or the driver that may be disposed in the non-display area (NDA) of the display panel 100 from being visible to the outside and it is possible to form the light shielding layer 400 on the top surface and the side surface of the display panel 100 through one process and to effectively prevent the light leakage phenomenon from being generated on the side surface of the display panel 100 in the case of the display device with a very small bezel or without a bezel.

On the other hand, according to an exemplary embodiment of the present invention, the light shielding layer 400 may be formed of a printed layer to which a black material is printed.

As described above, since the light shielding layer 400 is for shielding external light incident on the display device 10 and light emitted from the display panel 100, the light shielding layer 400 may be realized by a printing method using black colored dye that may absorb light.

At this time, in order to realize the light shielding layer 400, before a process of attaching the polarizing plate 500 to the display panel 100, printing may be performed on the top surface and the side surface of the display panel 100 using an inkjet method or a roll transcription method. However, the method of printing the light shielding layer 400 is not limited to the above and the light shielding layer 400 may be printed in various methods.

On the other hand, according to another exemplary embodiment of the present invention, the light shielding layer 400 may be formed of a printed layer to which a metal mirror material is printed.

Since a metal mirror reflects light unlike the above-described black dye, the metal mirror is not made to be black. However, since reflected light is absorbed by the polarizing plate 500 positioned on the metal mirror so that light is shielded, the metal mirror may realize a black color.

In addition, when the metal mirror printed layer is realized, since the color of the light shielding layer 400 positioned in the non-display area (NDA) of the display panel 100 may be similar to the color of the display area (DA) in the display panel 100, it is possible to improve the quality of the display device 10 in comparison with the case in which the light shielding layer 400 is formed of an artificial black dye printed layer.

Further, according to an exemplary embodiment of the present invention, the light shielding layer 400 may be formed so that the thickness of the region formed on the top surface of the display panel 100 is about 2-3 μm.

Referring to FIG. 1, the adhesive layer 300 is positioned between the display panel 100 and the polarizing plate 500 in order to attach the polarizing plate 500 onto the display panel 100, which is because bubbles may be generated by a printing step difference when the light shielding layer 400 formed on the top surface of the display panel 100 is thick.

Therefore, the light shielding layer 400 may be formed of a thin printed layer and may be formed to a thickness of 2-3 μm in order to prevent bubbles from being generated by a step difference.

As described above, in the display device 10 according to an exemplary embodiment of the present invention, the film-shaped polarizing plate 500 is positioned on the display panel 100 and the light shielding layer 400 for shielding light of the non-display area (NDA) of the display panel 100 is positioned between the display panel 100 and the polarizing plate 500 so that it is not necessary to form an additional light shielding unit on the polarizing plate 500.

In addition, the display device 10 according to an exemplary embodiment of the present invention may include the light shielding layer 400 positioned at the edge corresponding to the non-display area (NDA) of the display panel 100 between the display panel 100 and the polarizing plate 500 so that it is possible to prevent the circuit wire positioned on the outline of the display device 10 corresponding to the non-display area (NDA) of the display panel 100 from being visible to the outside.

In the display device 10 according to an exemplary embodiment of the present invention, the light shielding layer 400 is formed to be bent to surround the top surface and the side surface of the display panel 100 so that it is possible to prevent the light leakage phenomenon from being generated on the side surface of the display panel 100.

On the other hand, in the display device 10 according to another exemplary embodiment of the present invention, the polarizing plate 500 is positioned on the display panel 100 and the light shielding layer 400 is formed of the printed layer to which the metal mirror is printed so that, although external light incident on the display device 10 is reflected by the display panel 100 or the metal mirror, reflected light is absorbed into the polarizing plate 500. Therefore, since it is possible to simultaneously prevent the circuit wire positioned in the non-display area (NDA) from being visible to the outside and realize the color of the light shielding layer 400 positioned in the non-display area (NDA) to be similar to the color of the display area (DA) in the display panel 100, it is possible to improve the display quality of the entire display device 10.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a display panel comprising a display area for displaying an image and a non-display area adjacent to the display area;
a polarizing plate positioned on the display panel and comprising a polarizing layer for polarizing light that passes through the polarizing layer;
a light shielding layer positioned between the display panel and the polarizing plate; and
an adhesive layer positioned between the polarizing plate and the light shielding layer; wherein
the polarizing plate is extended over the light shielding later; and
the display area comprises a substrate, a wire unit, an organic light emitting element, and an encapsulation layer, and the non-display area comprises the substrate and the encapsulation layer;
the light shielding layer is formed at an edge of the display panel to correspond to the non-display area to surround a top surface and a side surface of the display panel; and
the light shielding layer is formed to be bent and extended from the top surface of the display panel to the side surface of the display panel; wherein
the substrate comprises a first surface and a second surface facing away from the first surface,
the first surface of the substrate and the light shielding layer contact each other corresponding to the non-display area,
the second surface of the substrate and the encapsulation layer are attached to and contact each other to be sealed up corresponding to the non-display area, and the substrate and the encapsulation layer do not contact each other corresponding to the display area;

the encapsulation layer encapsulates the wire unit and the organic light emitting element on the second surface of the substrate; and the adhesive layer covers and contacts the first surface and the light shielding layer.

2. The display device of claim 1, wherein the polarizing plate further comprises a phase delay layer positioned between the polarizing layer and the light shielding layer.

3. The display device of claim 2, wherein the phase delay layer delays a phase of the light by $\lambda/4$.

4. The display device of claim 1, wherein the polarizing plate further comprises a protective layer positioned on the polarizing layer.

5. The display device of claim 1, wherein the light shielding layer is a printed layer to which a black material is printed.

6. The display device of claim 1, wherein the light shielding layer is a printed layer to which a metal mirror material is printed.

7. The display device of claim 1, wherein the light shielding layer formed on the top surface of the display panel is formed to a thickness of 2-3 μm.

* * * * *